(12) United States Patent
Mahini

(10) Patent No.: US 7,330,737 B2
(45) Date of Patent: Feb. 12, 2008

(54) MOBILE PHONE MULTI-MEDIA CRADLE

(75) Inventor: Hassan Mahini, Carboro, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 184 days.

(21) Appl. No.: 11/160,995

(22) Filed: Jul. 19, 2005

(65) Prior Publication Data
US 2007/0021148 A1 Jan. 25, 2007

(51) Int. Cl.
*H04B 1/38* (2006.01)
*H04M 1/00* (2006.01)

(52) U.S. Cl. .................. 455/557; 455/550.1; 455/462; 455/41.3; 455/553.1

(58) Field of Classification Search ............... None
See application file for complete search history.

(56) References Cited

U.S. PATENT DOCUMENTS

| | | | |
|---|---|---|---|
| 5,452,180 A * | 9/1995 | Register et al. | 361/686 |
| 5,566,226 A | 10/1996 | Mizoguchi et al. | |
| 5,867,794 A * | 2/1999 | Hayes et al. | 455/557 |
| 5,907,815 A | 5/1999 | Grimm et al. | |
| 5,940,767 A * | 8/1999 | Bourgeois et al. | 455/466 |
| 6,035,214 A | 3/2000 | Henderson et al. | |
| 6,073,031 A * | 6/2000 | Helstab et al. | 455/557 |
| 6,240,297 B1 * | 5/2001 | Jadoul | 455/466 |
| 6,766,175 B2 * | 7/2004 | Uchiyama | 455/462 |
| 7,047,039 B2 * | 5/2006 | Lalley | 455/556.2 |
| 7,116,939 B1 * | 10/2006 | Kandler | 455/41.3 |
| 2001/0021659 A1 | 9/2001 | Tatsuaki | |
| 2002/0086703 A1 * | 7/2002 | Dimenstein et al. | 455/557 |
| 2002/0103008 A1 * | 8/2002 | Rahn et al. | 455/557 |

(Continued)

FOREIGN PATENT DOCUMENTS

EP 0269096 6/1988

(Continued)

OTHER PUBLICATIONS

Sony Ericsson Mobile Communications AB, "International Application No. PCT/US06/07061", International Search Report, Sep. 20, 2006.

(Continued)

*Primary Examiner*—Steve M. D'Agosta
(74) *Attorney, Agent, or Firm*—Frederick D. Bailey; Moore & Van Allen, PLLC

(57) ABSTRACT

A multi-media cradle adapted to receive a mobile phone comprises a housing and a cradle mounted to the housing for seating the mobile phone. When seated, the multi-media cradle is electrically coupled with the mobile phone via a system bus line. A display is included for viewing text and images originally intended for the mobile phone's display. Similarly, a speaker and microphone is included for reproducing audio input/output of the mobile phone. In addition, a QWERTY type keyboard is included for text and character entry. Data ports allow the multi-media cradle to be coupled with a variety of peripheral devices and removable storage media ports receive removable storage media such that data can be stored, retrieved, and exchanged between a removable storage media and the mobile phone. Also included are one or more short range RF transceivers for exchanging data from the mobile phone with an external device.

5 Claims, 2 Drawing Sheets

U.S. PATENT DOCUMENTS

| | | | |
|---|---|---|---|
| 2002/0119800 A1* | 8/2002 | Jaggers et al. | 455/550 |
| 2003/0003901 A1* | 1/2003 | Kuroiwa | 455/419 |
| 2003/0025674 A1* | 2/2003 | Watanabe | 345/168 |
| 2004/0100447 A1* | 5/2004 | Ozolins | 345/170 |

FOREIGN PATENT DOCUMENTS

| | | |
|---|---|---|
| EP | 0269096 A2 | 6/1988 |
| EP | 0269096 A3 | 6/1988 |
| EP | 0704788 A2 | 3/1996 |
| EP | 0704788 | 4/1996 |

OTHER PUBLICATIONS

Sony Ericsson Mobile Communications AB, "International Application No. PCT/US06/07061", Written Opinion, Sep. 20, 2006.

* cited by examiner

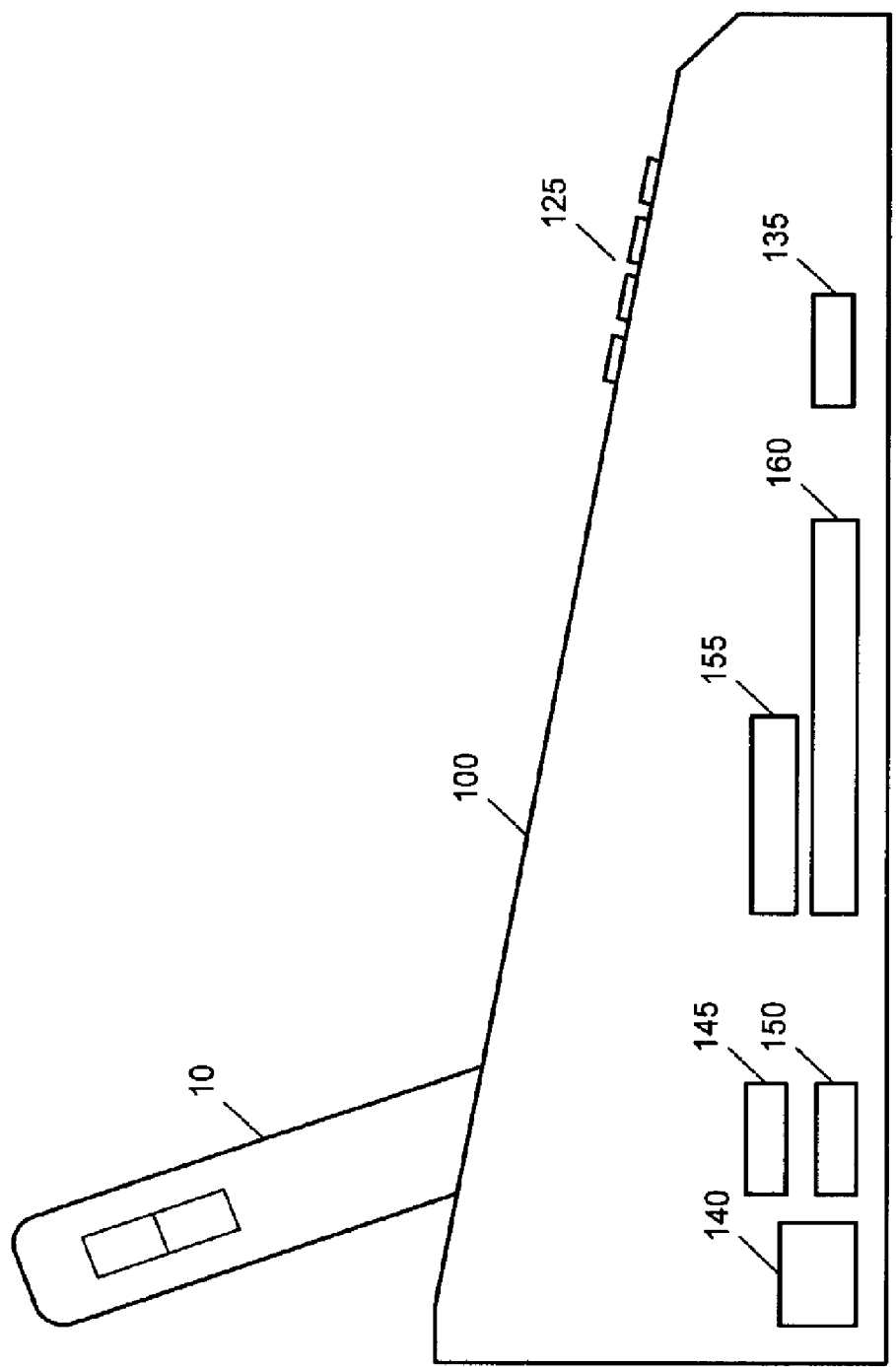

MOBILE PHONE MULTI-MEDIA CRADLE

BACKGROUND

Mobile phones today offer an impressive variety of multi-media functions designed to enhance the user experience. These functions include e-mail access, high speed data networks, digital camera and video functionality, and music storage and playback. Thus, today's mobile phones can combine elements of telephony, personal digital assistants (PDAs), Internet access for web-browsing or e-mail, proprietary data exchanges such as short messaging service (SMS) or multi-media messaging service (MMS), instant messaging (IM), a platform for software applications, photography, and music such as MP3 players.

Mobile phones have a form factor designed for portability. Portability, however, limits the user experience when utilizing one or more of the aforementioned multi-media functions. For instance, audio fidelity for a mobile phone is well below that of a Hi-Fi stereo system. The mobile phone's display can not compare to that of a television (even a small one). The mobile phone's user input mechanisms suffer in comparison to standard computer data entry devices like a keyboard or a mouse.

Thus, while the mobile phone is technically capable of many functions, the user experience suffers in comparison to other devices.

What is needed is a means for providing an enhanced user experience utilizing the mobile phone's existing system bus connector when utilizing the multi-media functions included on today's mobile phones.

SUMMARY

A multi-media cradle adapted to receive a mobile phone comprises a housing and a cradle mounted to the housing for seating the mobile phone. When seated, the multi-media cradle is electrically coupled with the mobile phone via a system bus line. A display is included for viewing text and images originally intended for the mobile phone's display. Similarly, a speaker and microphone is included for reproducing audio input/output of the mobile phone. In addition, a QWERTY type keyboard is included for text and character entry. Data ports allow the multi-media cradle to be coupled with a variety of peripheral devices and removable storage media ports receive removable storage media such that data can be stored, retrieved, and exchanged between a removable storage media and the mobile phone. Also included are one or more short range RF transceivers for exchanging data from the mobile phone with an external device.

The multi-media cradle further includes an enhanced numeric keypad mounted to the housing for accessing the mobile phone's call control features allowing the multi-media cradle to dial numbers, send and receive calls.

The plurality of data ports include one or more of an Ethernet port, a USB port, an IEEE 1394 port, and a mouse port. The plurality of removable storage media ports include one or more of a Memory Stick™ port and a compact flash card port.

One of the short range RF transceivers is for broadcasting audio output from the mobile phone to an external device. This RF transceiver is a tunable transmitter that can broadcast audio signals over the frequency spectrum associated with FM band radio.

Other RF transceivers include a 802.11x Wi-Fi transceiver, and a Bluetooth™ transceiver.

BRIEF DESCRIPTION OF THE DRAWINGS

FIG. 2 illustrates a side view of the multi-media cradle illustrated in FIG. 1.

DETAILED DESCRIPTION

Figure 1:
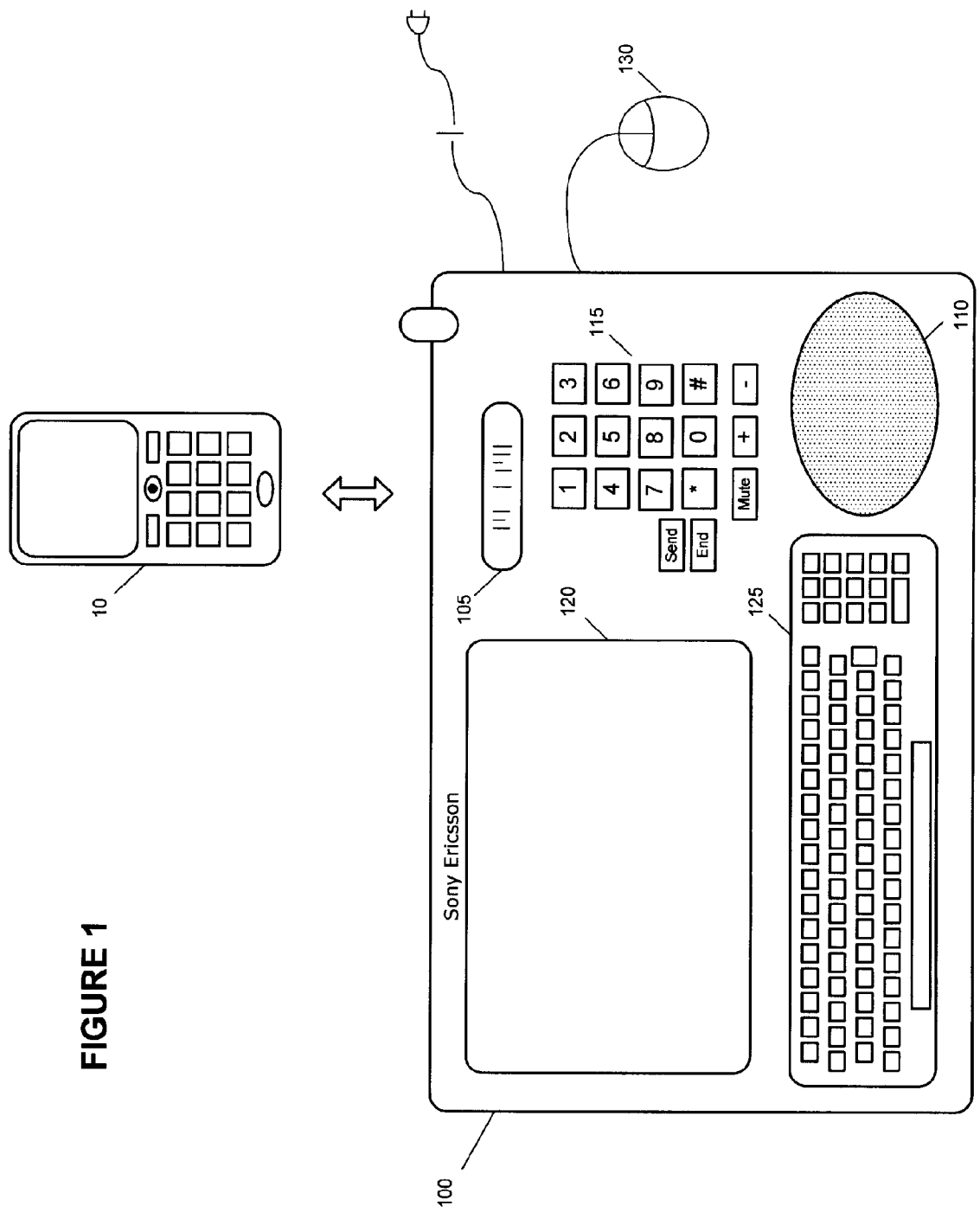
FIG. 1 illustrates a top view of a multi-media cradle.

The present invention describes a multi-purpose multi functional multi-media cradle 100 accessory for a mobile phone 10. The multi-media cradle provides a housing adapted to receive and seat, in a cradle 105, the mobile phone 10 through a system bus line that electrically couples the multi-media cradle 100 with the mobile phone 10. Once seated and properly connected, the multi-media cradle 100 can access and manipulate virtually all aspects of the mobile phone 10 via the system bus line.

The multi-media cradle 100 is a powered device that can be connected to a standard electrical outlet. When plugged in, the multi-media cradle 100 provides power to all of its own internal electronics. In addition, the multi-media cradle 100 also includes the electronics necessary to convert the AC input power and charge the mobile phone when it is seated in the multi-media cradle 100.

With respect to basic telephony operations, the multi-media cradle 100 includes a speaker 110 (or speakers for stereo sound) for handsfree operation of the mobile phone. A separate larger numerical keypad 115 is included on the housing to facilitate dialing and call control functions such as sending a call, ending a call, and adjusting the volume.

The multi-media cradle 100 also provides, on its primary exterior surface, a larger display 120 (on the order of a 7" diagonal screen size) and a full, or proportionally slightly reduced, standard QWERTY type keyboard 125. A mouse 130 can be connected to the multi-media cradle 100 via a port receptacle integrated into a side of the housing. The larger display 120 dramatically enhances the visibility and quality of items to be displayed such as photographs, videos, textual data like caller ID data, phonebook entries, or mobile word processing applications, or combinations of text and pictures such as web-pages. The standard keyboard 125 and mouse 130 greatly enhances the user's ability to input and manipulate data on the mobile phone 10 when compared to the dramatically smaller keys and navigation techniques built into the mobile phone 10.

The side of the housing can also accommodate multiple varied computer peripheral jacks, ports, or outlets including, but not limited to, an ethernet jack 140, a USB port 145, an IEEE 1394 video jack 150, a Memory Stick™ port 155, and a compact flash port 160. These ports allow the multi-media cradle 100 to connect and exchange data with a variety of other devices such as printers, network routers, computers, other larger displays, removable storage media, etc.

In addition, the multi-media cradle 100 incorporates short range RF transceivers for broadcasting signals wirelessly to other devices. The multi-media cradle 100 can, for instance, broadcast over the FM radio frequency using a low powered transmitter to send audio signals to a tunable FM band frequency. This allows the multi-media cradle 100 to "play" music over a hi-fi stereo system simply by tuning the hi-fi system to the frequency being broadcast by the multi-media cradle 100. Thus, the mobile phone's music library can be listened to on a hi-fi stereo as opposed to the lower fidelity mobile phone speaker system.

Other short range RF transmission protocols that can be supported and implemented into the multi-media cradle 100 include the Bluetooth™ standard and the 802.11 Wi-Fi standards.

To better illustrate the functions of the multi-media cradle 100, several use cases are presented. The following scenarios are not exhaustive of the multi-media cradle's 100 capabilities, merely illustrative. The cases include music broadcasting, photo/video viewing, file and data exchanges and synchronizations, handsfree operation, text editing including e-mail functions, and web-browsing.

Music Broadcasting

One of the trendiest and most desirable portable electronic device on the market today is the portable music player that can play music in a variety of data formats like MP3 or ATRAC among others. Such devices can and have been incorporated into mobile phones. Playback is typically accomplished via a set of headphones or via the mobile phone's relatively small speaker. Users of these devices greatly value their portability but would also like to listen to the music library in as high fidelity as possible. This can be achieved if the portable device can be coupled to a larger device for purposes of outputting the audio.

The multi-media cradle 100 provides a mechanism to broadcast music from the mobile phone 10 to a nearby hi-fi stereo system such as a home stereo or a portable stereo system commonly referred to as a "boom-box". Moreover, the multi-media cradle 100 uses its larger display 120 and navigation means (keyboard 125 and mouse 130) to allow for easier viewing and manipulation of the music library contained in the mobile phone 10.

In the vernacular of the portable music device, songs are organized into playlists. Playlists are merely sets of songs that are organized in a data file structure. The user can access and view his playlists via the mobile phone's display and navigation tools. When seated in the multi-media cradle, however, the user can view and manipulate (direct playback to a particular output source) using the larger easier to use mechanisms on the multi-media cradle 100.

The user can opt to broadcast a song or entire playlist (as opposed to listening via a headset) by selecting a broadcast option. The broadcast option will query the user for a FM frequency to transmit. The user preferably selects an unused area of the radio dial in his geographic area to avoid any interference. The multi-media cradle 100 will then transmit to the selected frequency. Any FM radio close enough to pick up the low power transmission from the multi-media cradle 100 can playback the song or playlist over its own hi-fi speaker system.

If there is no FM radio within range, the user can opt to re-direct the broadcast to t the multi-media cradle's 100 own speaker system. This would provide greater fidelity than that of the mobile phone 10 but not as robust playback as a home stereo system.

Photo/Video Viewing and Manipulation

Digital cameras are routinely incorporated into mobile phones these days. Typically, the digital camera can take still shots and record moving video snippets depending on the memory available. The quality of the video is steadily improving. The industry believes that users enjoy the ability to pictorially record and instantly send pictures and video over a data network to other mobile phone users or e-mail recipients. The mobile phone, however, again suffers from its portable form factor when it comes to viewing and manipulating pictures and video. The chief culprit is the small display on the mobile phone. Also bothersome are the relatively small user controls to navigate and manipulate the images and video. The multi-media cradle 100 provides relief on both issues. First, when the mobile phone is seated in the multi-media cradle 100 the images can be viewed on the multi-media cradle's larger display 120 which is approximately the size of a 4×6 inch photo print. Second, the multi-media cradle's keyboard 125 and mouse 130 provide easier navigational methods to manipulate and view the images. The display 125 can be both show the image and provide access to image manipulation actions such as zoom, slide show, attach to message, etc.

Images and videos can be readily imported into MMS or e-mail messages. They can also be copied to removable storage media such as Memory Stick™ or compact flash cards. The removable media can then be removed and used in other compatible devices. The images and videos can also be wireless transmitted using Bluetooth™, 802.11x Wi-Fi, infrared, or the like to nearby devices such as printers, computers, other mobile phones, or televisions.

File and Data Exchanges and Synchronizations

The computing power and sophistication of today's mobile phones is remarkable and keeps improving. PDA qualities allow for "office" type features such as e-mail, contact management, appointment scheduling, file management, and even software applications such as word processing. Naturally, these functions require a substantial amount of user interaction in the form of data input and in the interaction needed to execute the functions of the applications. As stated above, the relatively small user controls to navigate and manipulate the mobile phone as well as the limited audio and video output abilities of the mobile phone detract from the user experience. The multi-media cradle 100 significantly enhances the user experience and mobile phone capabilities via the larger display 120, keyboard 125, mouse 130, and various data ports 140, 145, 150, 155, 160, and wired or wireless transmission protocols.

When the mobile phone 10 is seated in the multi-media cradle 100, it has access to all of the aforementioned components of the multi-media cradle 100. Thus, the phone can be connected to other computers via an Ethernet or Wi-Fi TCP/IP network. The network connections in combination with appropriate software allows for easier data exchanges with other compatible devices. Data files can be moved and manipulated between or among devices using traditional computer like actions and interfaces. Data such as contacts and appointments can be synchronized between devices much easier than using the mobile phone's 10 own user interface.

Handsfree Operation

The multi-media cradle 100 can also act as a speakerphone to provide handsfree operation. When the mobile phone 10 is seated in the cradle 105, the mobile phone 10 can be operated using the enlarged numeric keypad 105 to place and receive calls. Speaker 110 can output the incoming voice while a microphone (not shown) can be used to pick-up and process outgoing voice. The multi-media cradle 100 can also be equipped with a headset jack to accommodate a wired headset. Or, multi-media cradle 100 can utilize one of its internal short range RF transceivers like Bluetooth™ to conduct a phone call via a wireless headset.

Text Editing Including E-Mail Functions

Since many mobile phones today include a plethora of PDA like functions including e-mail, the multi-media cradle 100 is designed to facilitate utilization of these features. Text editing of messages like SMS or MMS is made easier using the multi-media cradle display 120, keyboard 125, and mouse 130 as user input devices. These user input/output devices also make it easier to access and use any software applications running on the mobile phone 10.

Web-Browsing

Many mobile phone's have a built-in web-browsing ability that uses a mobile data protocol to access, upload, and download data from the Internet. Similar to the above relating to tesxt editing, the multi-media cradle 100 is designed to facilitate utilization of these features by providing enhanced user interface input/output devices like the enlarged display 120, the standard keyboard 125, and the mouse 130.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

What is claimed is:

1. A multi-media cradle adapted to receive a mobile phone, comprising:
    a housing;
    a cradle mounted to the housing for seating the mobile phone such that the multi-media cradle is electrically coupled with the mobile phone via a system bus line and the mobile phone will re-charge its battery when seated in the cradle;
    a display mounted to the housing for viewing text and images originally intended for the mobile phone's display;
    a speaker mounted to the housing for reproducing audio output originally intended for the mobile phone's speaker;
    a microphone mounted to the housing for picking up audio input originally intended for the mobile phone's microphone;
    a QWERTY type keyboard mounted to the housing for entering text and characters to be used by the mobile phone;
    a plurality of data ports mounted to the housing that allow the multi-media cradle to be coupled with a variety of peripheral devices;
    a plurality of removable storage media ports mounted to the housing and adapted to receive removable storage media such that data can be stored, retrieved, and exchanged between a removable storage media and the mobile phone;
    a short range RF transceiver, the short range RF transceiver being capable of exchanging data from the mobile phone with an external device and broadcasting audio output from the mobile phone to an external device, the short range RF transceiver being tunable for broadcasting audio signals over the frequency spectrum associated with FM band radio; and
    an enhanced numeric keypad mounted to the housing for accessing the mobile phone's call control features including dialing numbers, sending calls, and receiving calls.

2. The multi-media cradle of claim 1 wherein the plurality of data ports include one or more of an Ethernet port, a USB port, an IEEE 1394 port, and a mouse port.

3. The multi-media cradle of claim 1 wherein the plurality of removable storage media ports include one or more of a Memory Stick™ port and a compact flash card port.

4. The multi-media cradle of claim 1 wherein the short range RF transceiver is capable of 802.11x Wi-Fi communications.

5. The multi-media cradle of claim 1 wherein the short range RF transceiver is capable of Bluetooth™ communications.

* * * * *